United States Patent Office 3,294,746
Patented Dec. 27, 1966

3,294,746
POLYCARBONATES FROM DIMERS OF
ALKENYL PHENOLS
Alford G. Farnham, Mendham, N.J., assignor to Union
Carbide Corporation, a corporation of New York
No Drawing. Filed Mar. 8, 1962, Ser. No. 178,287
2 Claims. (Cl. 260—47)

This invention relates to dimers of alkenyl phenols, to a process for the preparation thereof and to products produced therefrom. More particularly, this invention relates to dimers of alkenyl phenols and to a process for the preparation thereof from the corresponding alkenyl phenol.

The dimers of the present invention have the general formula:

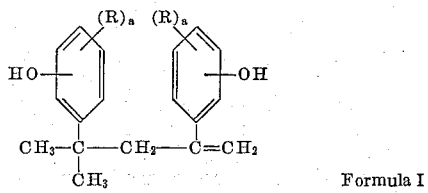

Formula I wherein each R, which on the same nucleus can be the same or different, but are the same with respect to corresponding R's on the other nucleus, are halogen atoms such as chlorine, bromine, iodine or fluorine, or alkyl, and when alkyl generally containing 1 to 4 carbon atoms inclusive and preferably containing 1 to 2 carbon atoms inclusive, as illustrated by methyl, ethyl, n-propyl, isopropyl, n-butyl and the like; each $a$ is an integer having a value of 0 to 4 inclusive and with the further limitation that each OH group is in a position other than meta with respect to the group linking the aromatic nuclei.

Particularly desirable dimers for purposes of this invention are those having the general formula:

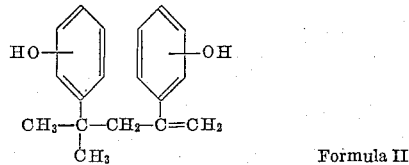

Formula II wherein each OH is in a position other than meta with respect to the group linking the aromatic nuclei.

The alkenyl phenols from which the dimers of the present invention are produced have the general formula:

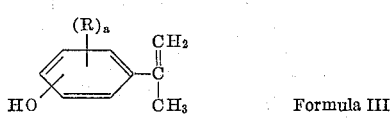

Formula III wherein R and $a$ are as previously defined and OH is in a position other than meta with respect to the alkenyl group.

Compounds falling within the scope of Formula III can be conveniently prepared according to the procedures set forth by B. B. Carson et al. in J. Organic Chemistry, 23 page 544 (1958).

The process, by which the dimers of the present invention are produced, is conducted by heating an alkenyl phenol falling within the scope of Formula III at a temperature of about 50° C. to about 200° C. and preferably at a temperature of about 85° C. to about 130° C. for a period of time sufficient to dimerize the desired alkenyl phenol. At temperatures lower than about 50° C., little if any alkenyl phenol is dimerized while at temperatures greater than about 200° C., most of the dimer formed is thermally decomposed back to the alkenyl phenol.

The dimerization reaction which the alkenyl phenol undergoes on being heated at the temperatures noted can be illustrated by the following equation:

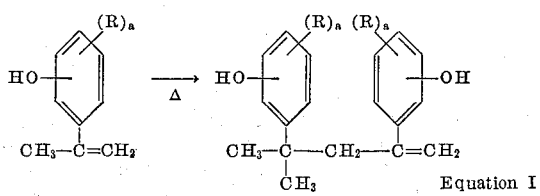

Equation I wherein R, $a$ and the position of each OH are as previously defined.

The pressure at which the dimerization reaction can be conducted can be atmospheric, subatmospheric or superatmospheric. It is preferred to conduct the reaction under atmospheric pressure.

The actual length of time that the alkenyl phenols are heated at the temperatures previously defined will, of course, vary and depend upon the alkenyl phenol which is being heated. As a rule, the heating cycle will vary from about 1 hour to about 4 hours.

At the temperatures at which the dimerization reaction is conducted, the dimers which are formed are liquids. In order to recover the dimers which are formed, it is convenient to cool the dimers to room temperature, about 23° C. whereby the dimers solidify and are recovered as solids.

If desired, the dimers so produced can be recrystallized from suitable solvents in order to insure removal therefrom of unreacted monomer. Suitable solvents for this purpose include toluene, benzene, ethanol, cyclohexane and the like.

The dimers of the present invention, falling within the scope of Formula I, can be hydrogenated to form compounds which have the following formula:

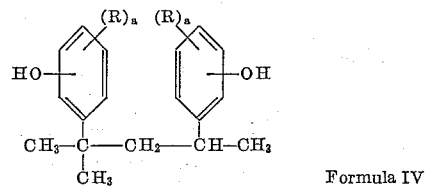

Formula IV where R, $a$ and the position of each OH group are as previously defined.

The hydrogenation reaction can be illustrated by the following equation:

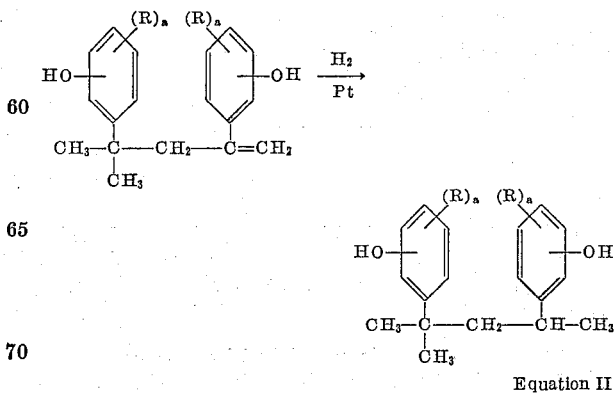

Equation II wherein R, a and the position of each OH are as previously described.

Particularly desirable hydrogenated dimers are those which have the following general formula:

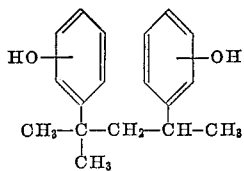

Formula V wherein the position of each OH is as previously defined.

In conducting the hydrogenation reaction, it is convenient to dissolve the dimer in a suitable solvent, as for example, a saturated aliphatic alcohol such as ethyl alcohol, adding to the resultant solution a catalyst, which is capable of adsorbing hydrogen gas and thereafter donating a hydrogen ion, such as palladium and platinum, and subjecting the solution to a hydrogen gas atmosphere, at a temperature of about 20° C. to about 60° C. under a pressure of about 1 to about 3 atmospheres.

A more complete description of a suitable hydrogenation process is to be found in a book entitled, "Reaction of Hydrogen," by Homer Adkins, University of Wisconsin Press, 1937.

Recovery of the hydrogenated dimer can be conveniently accomplished by first removing the catalyst by filtration, and, depending upon whether the dimer is soluble or insoluble in the solvent at low temperatures, cooling the solution to precipitate out the hydrogenated dimer and recovering the dimer as a filter cake; or distilling of the solvent and recovering the hydrogenated dimer.

The dimers of alkenyl phenols and the hydrogenated compounds produced therefrom can be reacted with an epihalohydrin, in the presence of an alkaline catalyst, to produce the corresponding diglycidyl ethers.

The diglycidyl ethers produced from compounds falling within the scope of Formula I have the general formula:

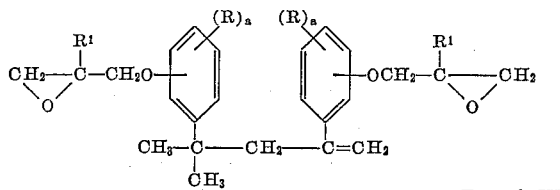

Formula VI

The diglycidyl ethers produced from compounds falling within the scope of Formula IV have the general formula:

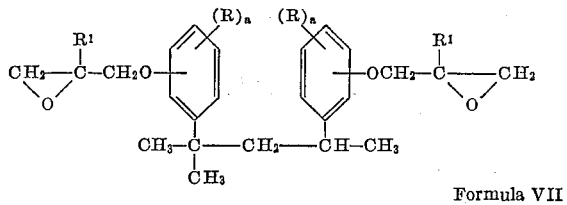

Formula VII wherein in both Formula VI and Formula VII, R and a are as previously defined, $R^1$ is hydrogen or methyl and each glycidyl ether group is attached to its aromatic group in a position other than meta to group linking the aromatic muclei.

Exemplary of suitable epihalohydrins that can be reacted with the dimers and the hydrogenated dimers to produce the corresponding diglycidyl ethers can be noted the epihalohydrins of the formula:

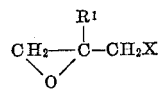

Formula VIII wherein $R^1$ is as defined and X is a halogen such as chlorine or bromine.

In conducting the reaction between an epihalohydrin and a dimer or its hydrogenated derivative, as defined, various amounts of reactants can be employed. Generally, the amount of an epihalohydrin employed will be at least one mole per each OH equivalent of the dimer or of the hydrogenated dimer, and preferably from about 3 to about 4 moles of an epihalohydrin per OH equivalent. More than about 4 moles of an epihalohydrin per OH equivalent can be used, but this results in little improvement in the yield of diglycidyl ether.

The reaction between an epihalohydrin and a dimer or hydrogenated dimer is usually carried out utilizing a catalyst which provides an alkaline medium for the reaction. As a rule, the catalysts used serve a dual purpose. Initially, they serve to catalyze the reaction of an epihalohydrin with the phenol to form the corresponding halohydrin ether and subsequently, they serve to dehydrohalogenate the chlorohydrin ether to the corresponding diglycidyl ether.

For a detailed discussion of suitable procedures to be used in conducting the reaction between an epihalohydrin and a phenol, including a discussion of suitable catalysts, suitable reaction temperatures and the like, reference is made to U.S. Patent 2,943,045 to A. G. Farnham et al.

The diglycidyl ethers of this invention can be cured to infusible products using any of the epoxide curing agents.

Curing agents are generally classified as hardeners, that is, curing agents which themselves react with the diglycidyl ethers; or are classified as catalysts, that is, curing agents which promote the self-reaction of the diglycidyl ethers.

When used, the hardener is present in amounts of from about 75 percent of stoichiometric to about 15 percent in excess of stoichiometric and preferably from about 90 percent of stoichiometric to about 10 percent in excess of stoichiometric, with respect to the amount of diglycidyl ether used.

In those instances wherein the curing agent used is a catalyst, the catalyst is used in amounts of from about 0.2 to about 5 percent by weight, preferably from about 0.5 to about 2 percent by weight, based on the weight of the diglycidyl ether.

Suitable curing agents are enumerated in my copending application Serial No. 168,830, entitled, "Phenols, a Process for the Preparation Thereof and Products Produced Therefrom," the disclosure of which is incorporated herein by reference.

Curable compositions of this invention find utility as protective coatings on various surfaces, such as metal and wood, and as adhesives for bonding such surfaces together; as potting compositions for electrical components and the like.

The dimers and hydrogenated dimers of this invention can also be reacted with phosgene in a manner as described in U.S. Patent 2,970,131, Moyer et al., to produce thermoplastic polycarbonate resins. The polycarbonate resins so produced have the following recurring structural units:

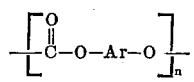

wherein Ar is the residue of the dimer or of the hydrogenated dimer.

The dimers and hydrogenated dimers can also be used as antioxidants for synthetic rubber and as reactants with formaldehyde to produce phenolic resole resins.

Example I

This example illustrates the preparation of a dimer which has the formula:

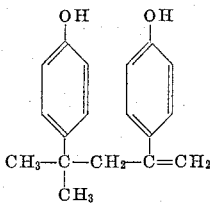

Two hundred and seventy-two grams of isopropenyl phenol having a boiling point of 115° C. at a pressure of 8 mm. of Hg were heated under a nitrogen gas atmosphere at a temperature of 125° C. for 1 hour. The yellow liquid which had formed was cooled to a temperature of about 115° C.–120° C. and seeded with crystals of the dimer, whereupon the mass entirely solidified to a white solid tinged with yellow.

The solid was melted by heating to a temperature of about 135° C., the melted product dissolved in hot toluene and recrystallized out of solution by cooling the solution to a temperature of 5° C.

The dimer was recovered as a filter cake in the form of white crystals which melted at a temperature of 127° C.–130° C. Two hundred and three grams of dimer were recovered which represented a yield of seventy-five percent by weight.

Infrared analysis of the dimer showed absorption bands at 11.2µ due to the

group, which is about half the absorption that is shown by p-isopropenyl phenol.

The procedure described in Example 1 was used to produce dimers from 2-methyl-isopropenyl phenol and 2-chloro-isopropenyl phenol.

Example II

This example illustrates the hydrogenation of the dimer of Example I to produce a compound which has the formula:

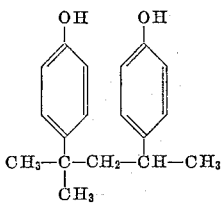

2-methyl-2,4-bis(p-hydroxyphenyl)pentane

Into a mixture of 53.6 grams of the dimer described in Example I, 200 cc. of ethyl alcohol, 0.3 gram of a catalyst composed of palladium adsorbed on charcoal (10 percent by weight of the catalyst was palladium), there was bubbled hydrogen gas under a pressure of 25 p.s.i.–40 p.s.i. for a period of 35 minutes. At the end of the 35-minute period, the mixture was filtered removing the catalyst as the filter cake. The solution recovered was heated at a temperature of 70° C. and under a pressure of 20 mm. of Hg with the result that the ethyl alcohol was distilled off.

The solid residue was recrystallized from toluene yielding 50 grams of white, crystalline 2-methyl-2,4-bis(p-hydroxyphenyl)pentane having a melting point of 111.5° C.

*Analysis.*—Molecular weight, found: 270. Calculated: 270. Percent OH, found: 12.2. Calculated: 12.6.

The hydrogenated dimer was shown to have the structure indicated by demonstrating that it gives, on reduction to remove the OH groups, the same hydrocarbon as does the unsaturated dimer of alpha-methyl styrene upon hydrogenation.

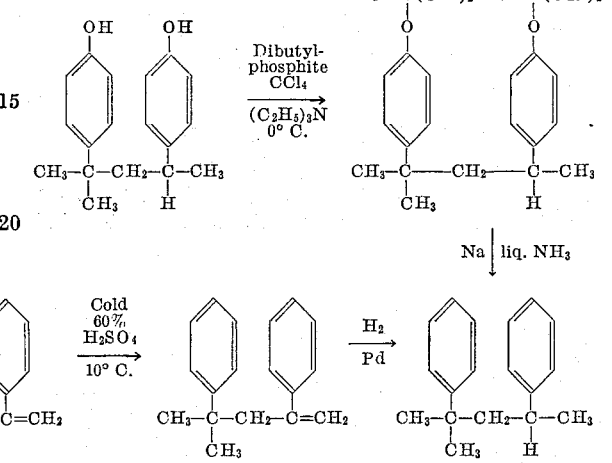

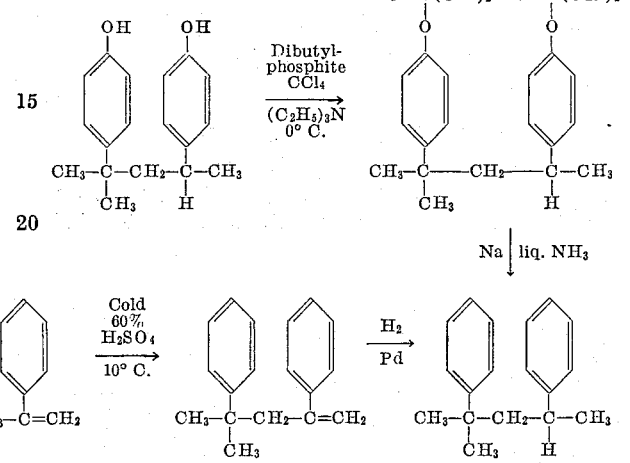

In the equations above R² stands for the n-butyl radical.

Example III

A mixture of 268 grams linear dimer of p-isopropenyl phenol (1.0 mole), 555 grams epichlorohydrin (6.0 moles) and 150 grams ethyl alcohol was stirred in a reaction flask and maintained at a temperature of 55–60° C. during the course of adding thereto 180 grams 50% NaOH at the rate of 10% in the first hour, 10% in the next one-half hour, and 80% in the next hour. After a further reaction time of 15 minutes at 55–60° C., the reaction mixture was subjected to distillation under pressure of 25–40 mm. of Hg with agitation until the residue product temperature reached 65° C. The residue product was then cooled, dissolved in 1,000 cc. toluene and the toluene solution washed several times with water to remove salt and residual alkali. The washed toluene solution was then distilled under 25–50 mm. of Hg pressure to a residue temperature of 110° C. The residual yield was 376 grams viscous liquid product which showed on analysis an epoxy assay of 214 grams per epoxide equivalent.

It is to be understood that the disclosures of all patents and literature references noted in this application are incorporated herein by reference.

What is claimed is:

1. A thermoplastic polycarbonate having recurring structural units of the formula:

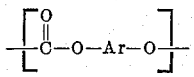

wherein Ar is the residue of a compound having the formula:

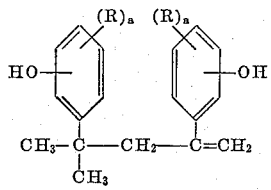

wherein R is selected from the group consisting of halogen and alkyl, *a* is an integer having a value of 0 to 4 inclusive and with the further limitation that each OH is in a position other than meta with respect to the group linking the aromatic nuclei.

2. A thermoplastic polycarbonate as defined in claim 1 wherein Ar is the residue of a compound having the formula:

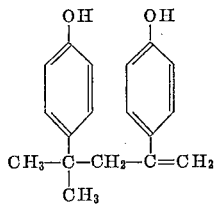

References Cited by the Examiner
UNITED STATES PATENTS

| | | | |
|---|---|---|---|
| 2,806,016 | 9/1957 | Schwarzer | 260—619 |
| 2,970,131 | 1/1961 | Moyer et al. | 260—47 X |
| 2,979,534 | 4/1961 | Petropoulos et al. | 260—619 |
| 3,049,568 | 8/1962 | Apel et al. | 260—619 |

FOREIGN PATENTS

| | | |
|---|---|---|
| 1,004,168 | 3/1957 | Germany. |
| 903,062 | 8/1962 | Great Britain. |

OTHER REFERENCES

Corson, J. Organic Chem., vol. 23, pp. 544–549, April 1958.

Corson, et al., J. Organic Chem., 23:544–546 (1958), 3 pp.

Derwent, Belgium Patents Report, vol. 1, No. 78A (May 16–31, 1961), page C–10 (Belgian Patent No. 597,434), 1 page.

WILLIAM H. SHORT, *Primary Examiner.*

LEON J. BERCOVITZ, R. W. GRIFFIN, J. C. MARTIN,
*Assistant Examiners.*